(12) United States Patent
Takahashi et al.

(10) Patent No.: US 10,227,026 B2
(45) Date of Patent: Mar. 12, 2019

(54) VEHICLE SEAT

(71) Applicant: TOYOTA JIDOSHA KABUSHIKI KAISHA, Toyota-shi, Aichi-ken (JP)

(72) Inventors: Gen Takahashi, Nagakute (JP); Daisuke Ito, Kasugai (JP); Hideki Kobayashi, Miyoshi (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/895,283

(22) PCT Filed: May 28, 2014

(86) PCT No.: PCT/JP2014/002806
§ 371 (c)(1),
(2) Date: Dec. 2, 2015

(87) PCT Pub. No.: WO2014/196161
PCT Pub. Date: Dec. 11, 2014

(65) Prior Publication Data
US 2016/0121770 A1    May 5, 2016

(30) Foreign Application Priority Data
Jun. 4, 2013 (JP) .................................. 2013-117888

(51) Int. Cl.
*B60N 2/68* (2006.01)
*B60N 2/80* (2018.01)

(52) U.S. Cl.
CPC ................ *B60N 2/68* (2013.01); *B60N 2/80* (2018.02); *B60N 2205/20* (2013.01)

(58) Field of Classification Search
CPC ......... B60N 2/48; B60N 2/68; B60N 2205/20
See application file for complete search history.

(56) References Cited

U.S. PATENT DOCUMENTS

| 4,756,551 A * | 7/1988 | Miller .................. B60N 2/4802 280/751 |
| 5,681,088 A * | 10/1997 | Takei .................... B29C 44/581 297/408 |
| 6,625,830 B2 * | 9/2003 | Lampel ................ A47C 27/146 297/452.26 |
| 9,387,784 B2 * | 7/2016 | Haga .................... B60N 2/4805 |
| 9,452,697 B2 * | 9/2016 | Okubo .................... B60N 2/48 |
| 2008/0211151 A1 * | 9/2008 | Wieser .................... F16F 7/108 267/136 |
| 2010/0283307 A1 | 11/2010 | Fujita |
| 2014/0312675 A1 * | 10/2014 | Okubo ................. B60N 2/4808 297/410 |

(Continued)

FOREIGN PATENT DOCUMENTS

| JP | H10-226255 A | 8/1998 |
| JP | 2001-161489 A | 6/2001 |
| JP | 2010-194246 A | 9/2010 |

(Continued)

*Primary Examiner* — Philip F Gabler
(74) *Attorney, Agent, or Firm* — Hunton Andrews Kurth LLP

(57) ABSTRACT

A vehicle seat includes a frame member (13) of the seat, a cushion material (14) covering the frame member, a soft member (25) that is softer than the cushion material and secured to the frame member, and a weight (24) located in the soft member.

14 Claims, 14 Drawing Sheets

(56) References Cited

U.S. PATENT DOCUMENTS

2015/0183343 A1* 7/2015 Okubo ................ B60N 2/48
                                                                    297/404
2015/0246628 A1* 9/2015 Ishimoto .............. B60N 2/48
                                                                    297/410

FOREIGN PATENT DOCUMENTS

| JP | 2010-201848 A | | 9/2010 |
|---|---|---|---|
| JP | 2011-208309 | * | 9/2011 |
| JP | 2012-164203 | * | 7/2012 |
| JP | 2012-211326 | * | 9/2012 |
| WO | 2013/042791 A1 | | 3/2013 |

* cited by examiner

[Fig. 1]
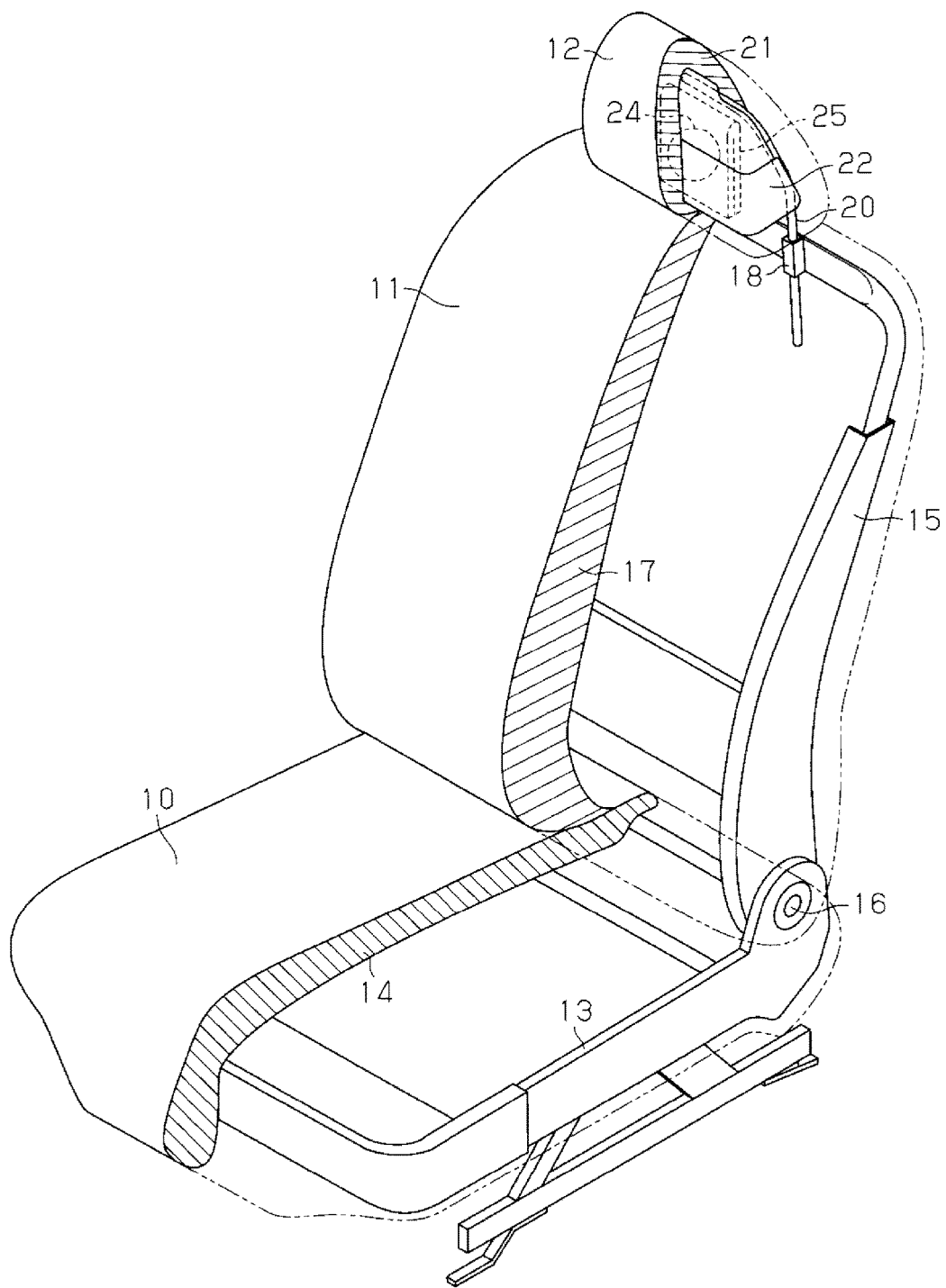

[Fig. 2]
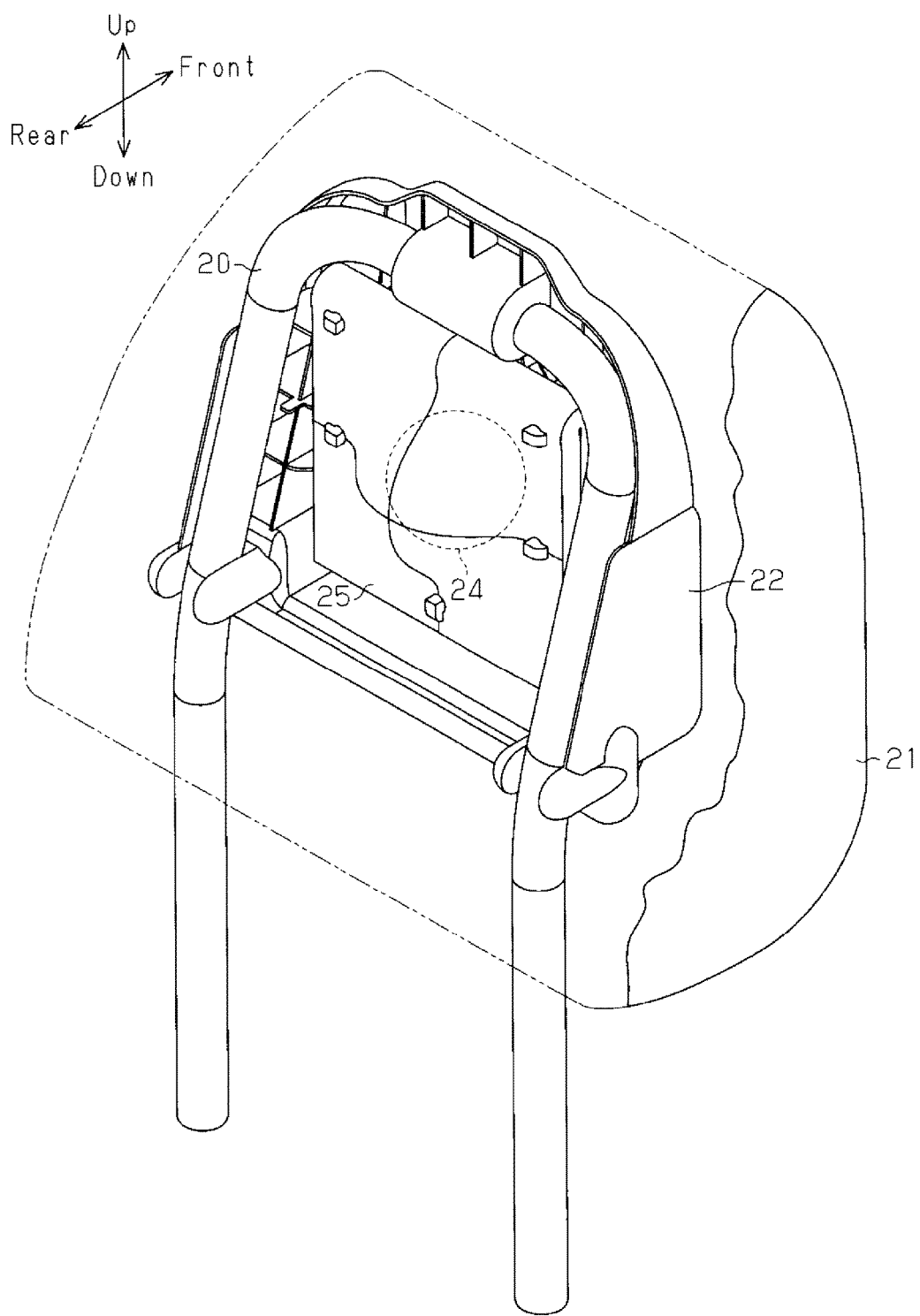

[Fig. 3]
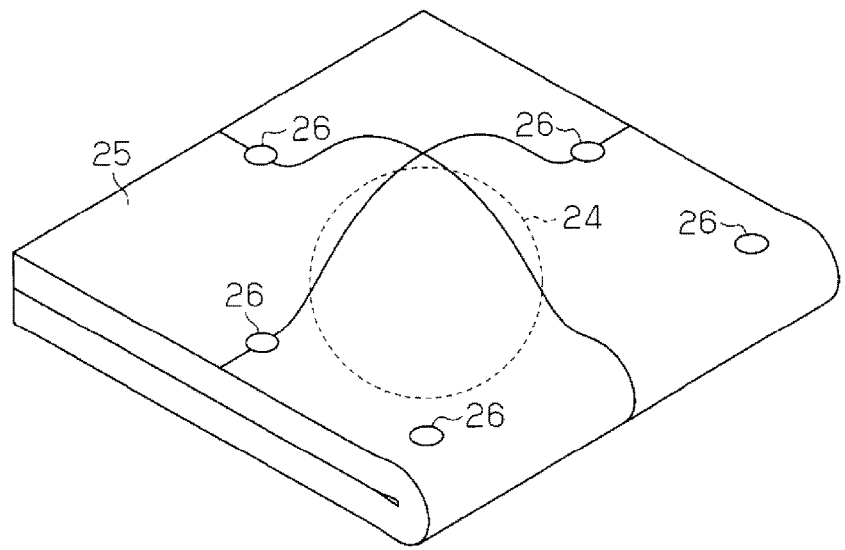
[Fig. 4]
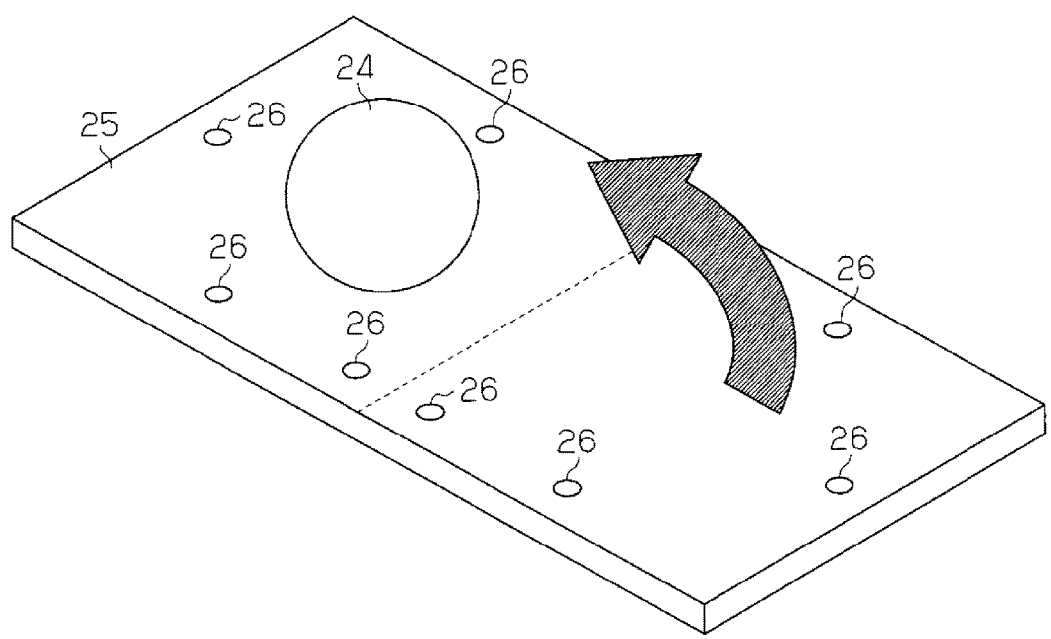

[Fig. 5]
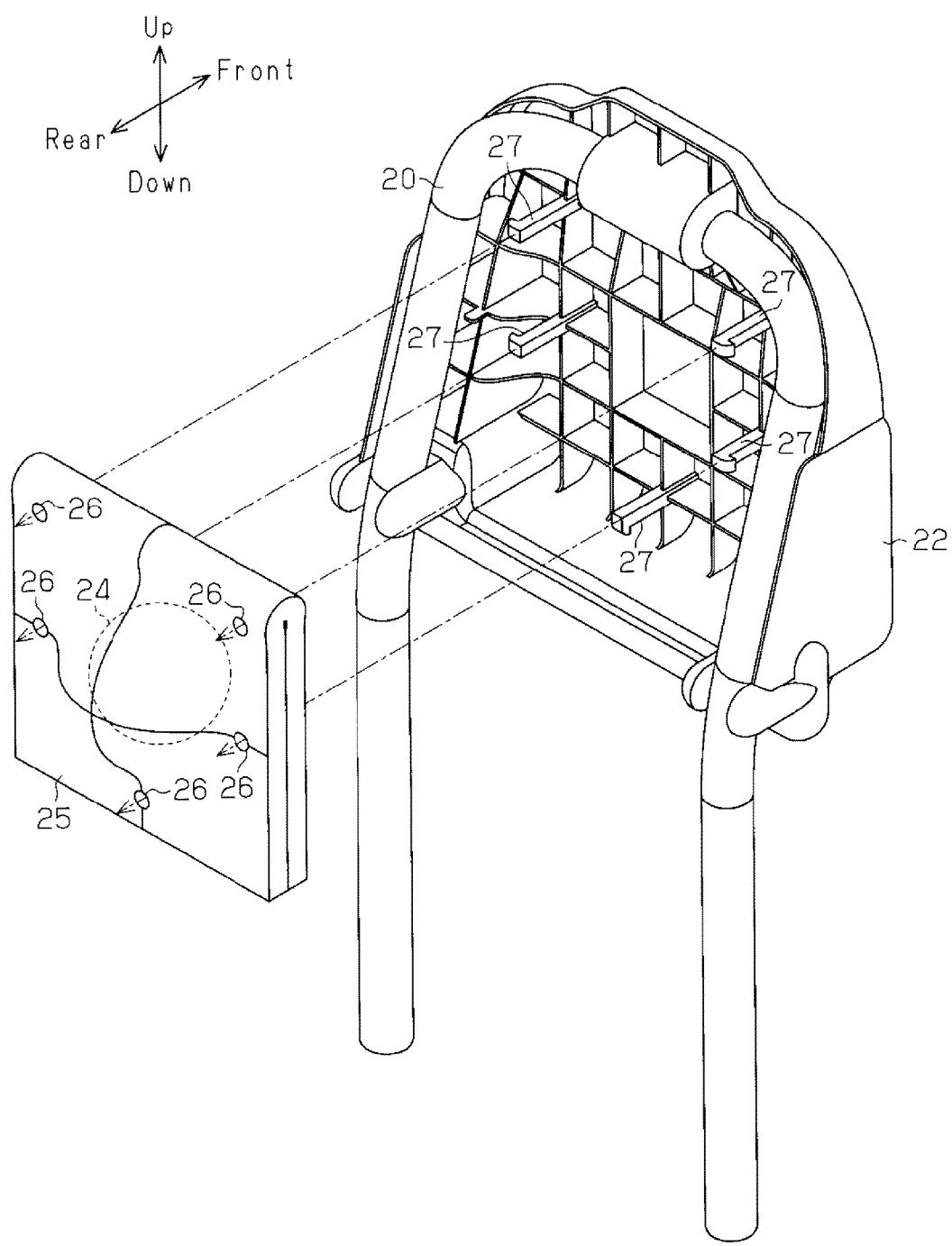

[Fig. 6]
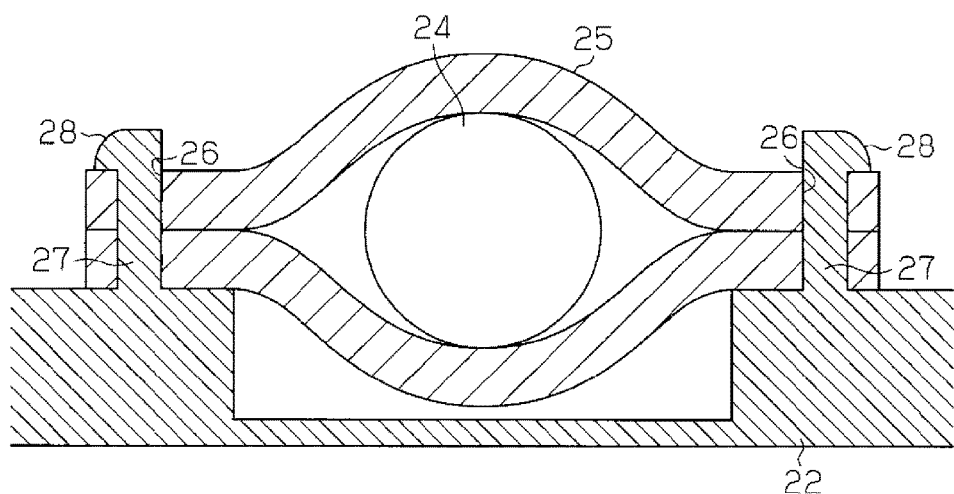
[Fig. 7]
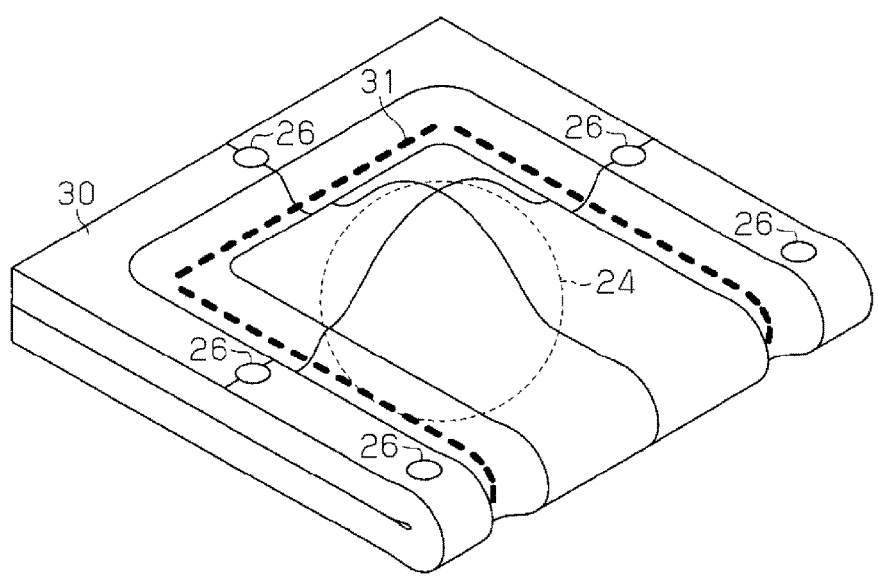

[Fig. 8]
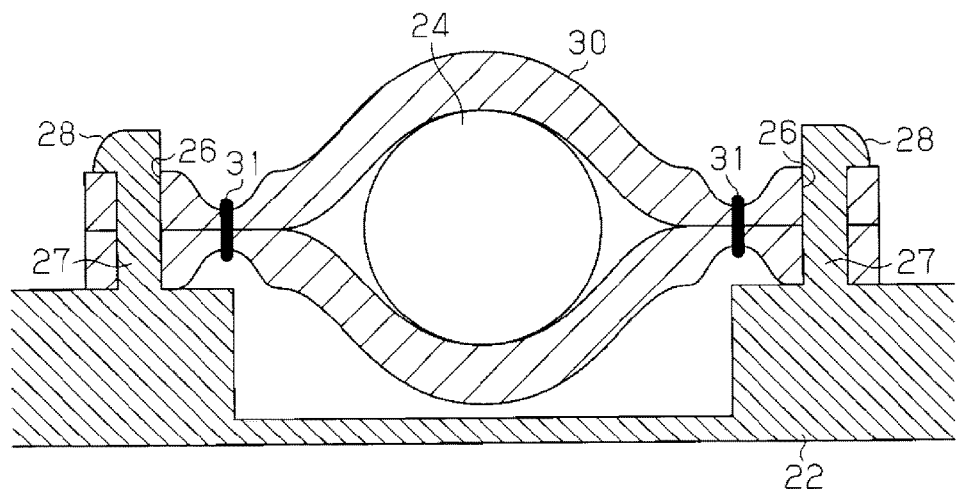
[Fig. 9]
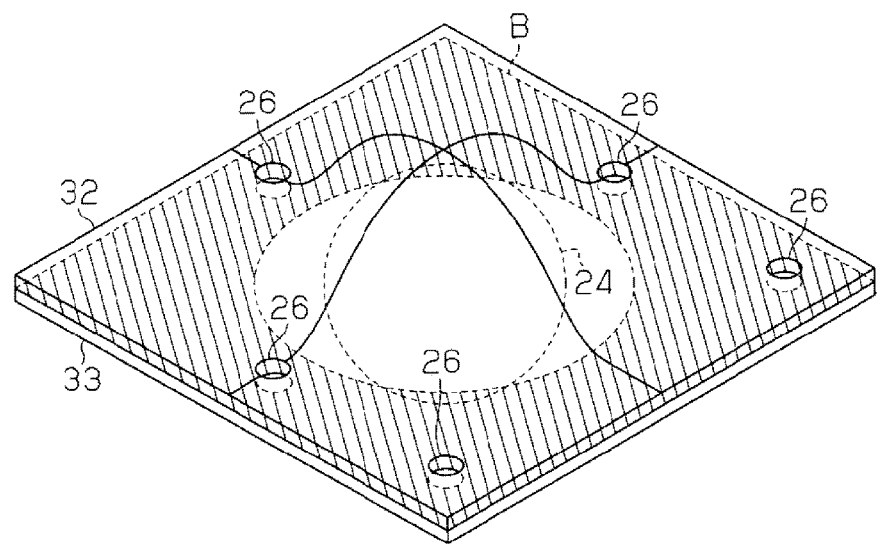

[Fig. 10]
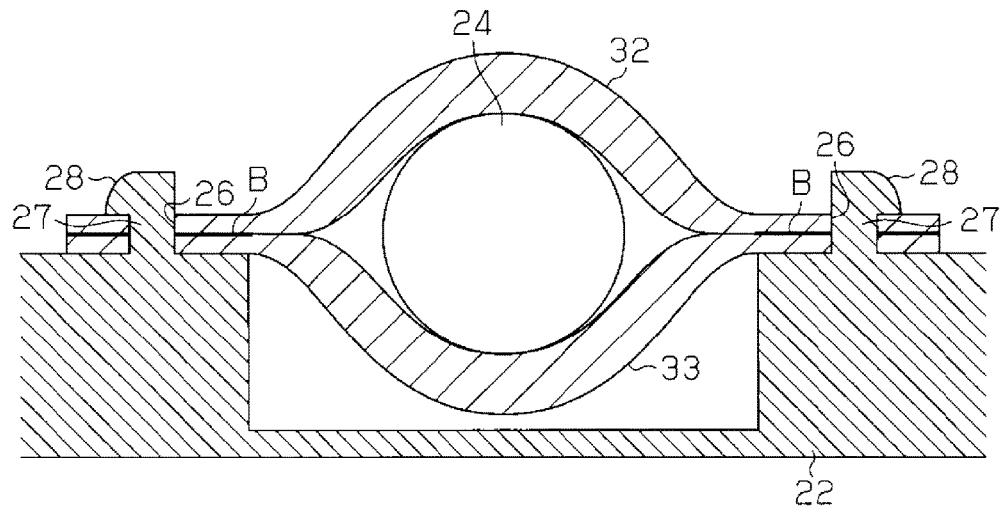
[Fig. 11]
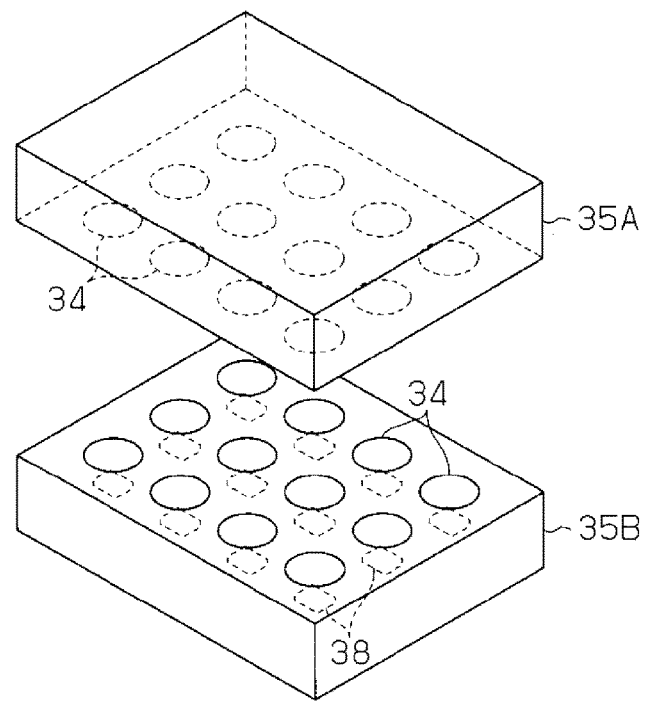

[Fig. 12]
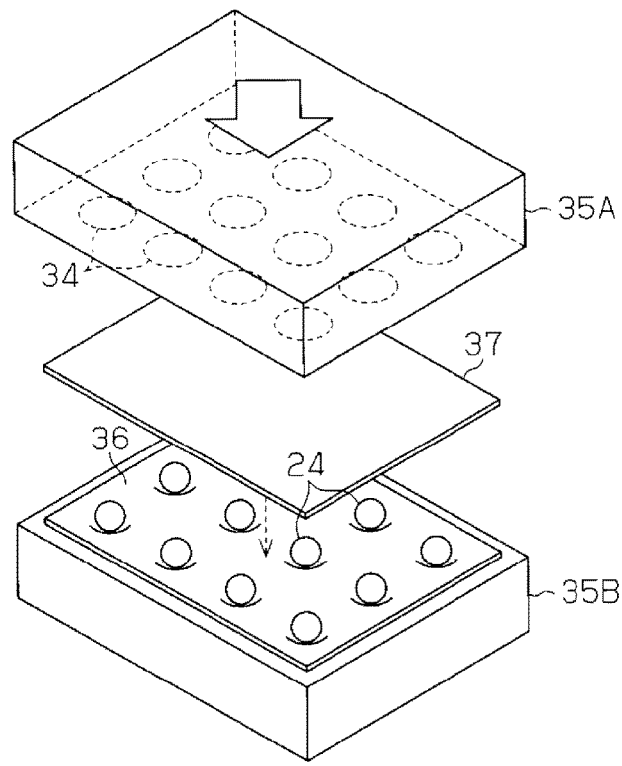
[Fig. 13]
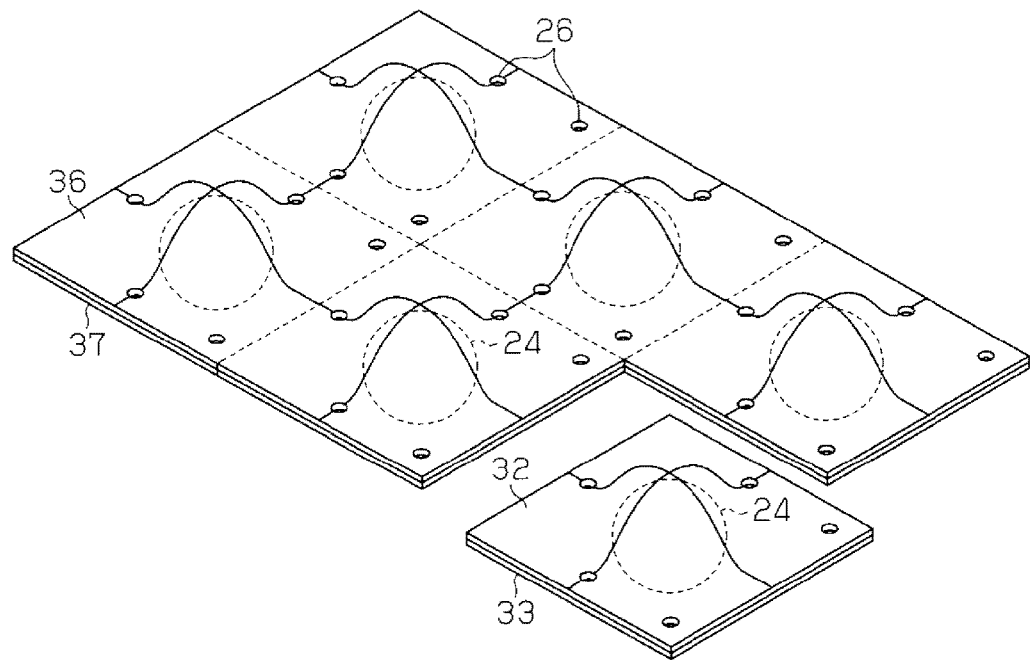

[Fig. 14]
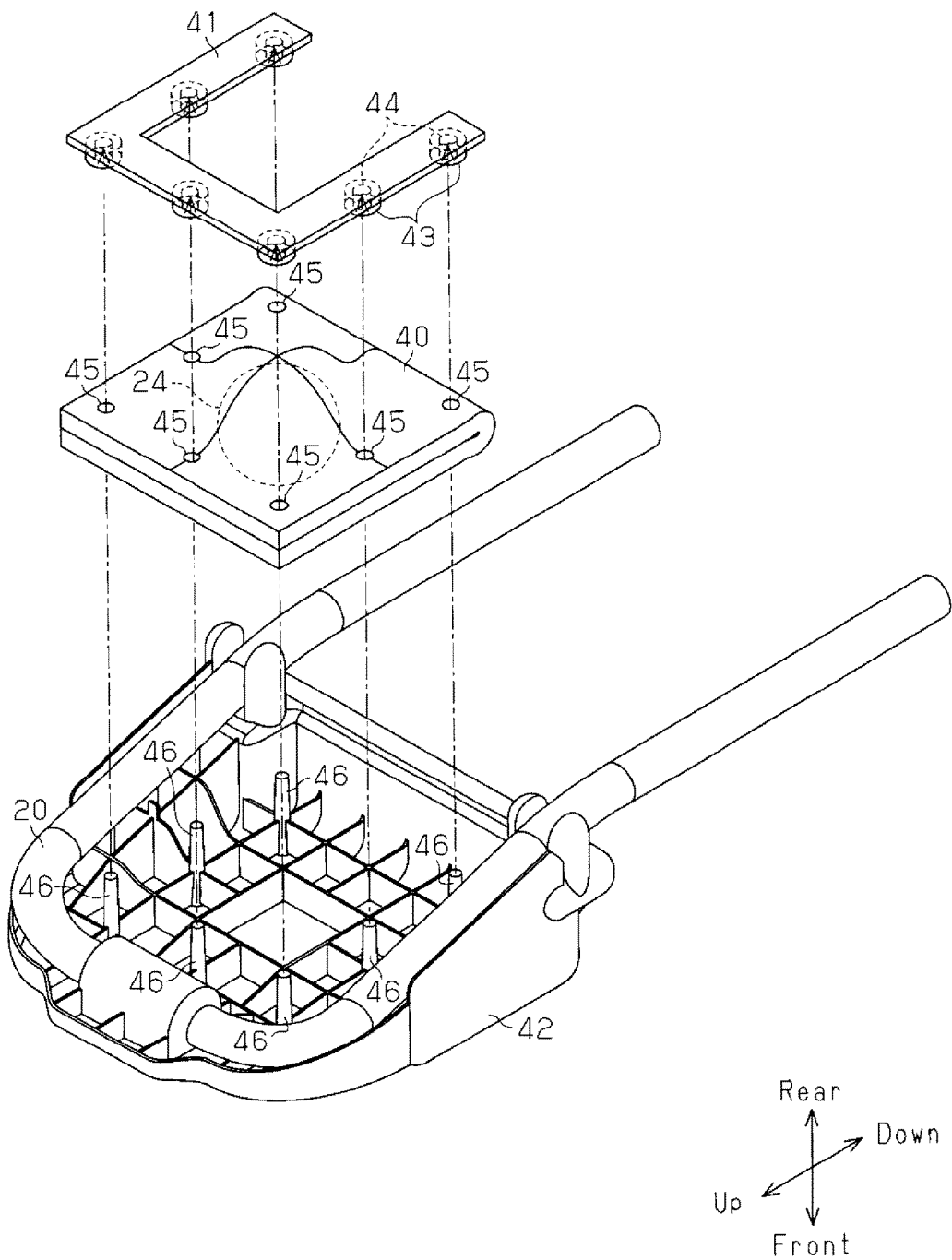

[Fig. 15]
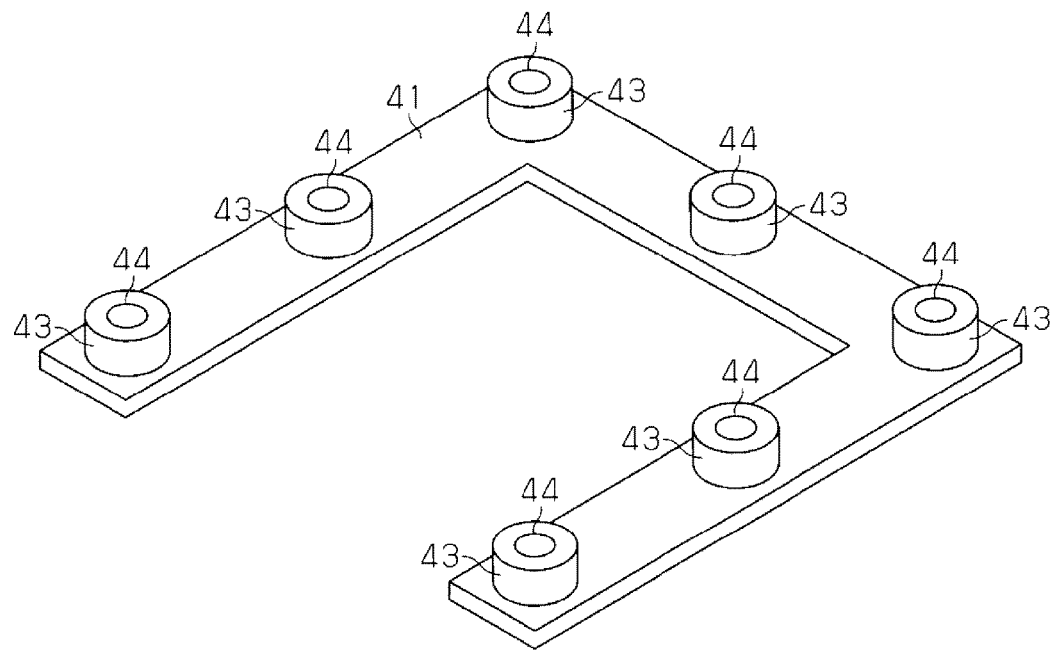
[Fig. 16]
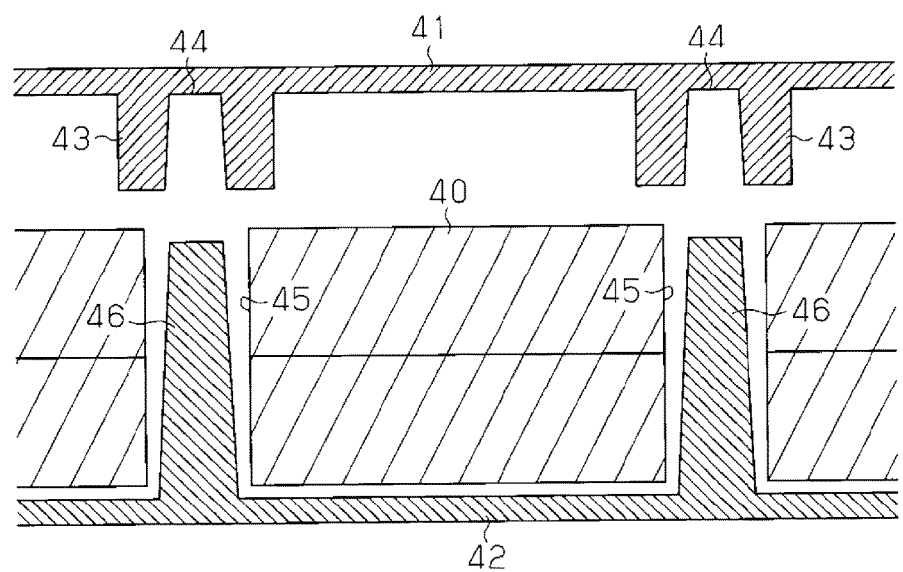

[Fig. 17]
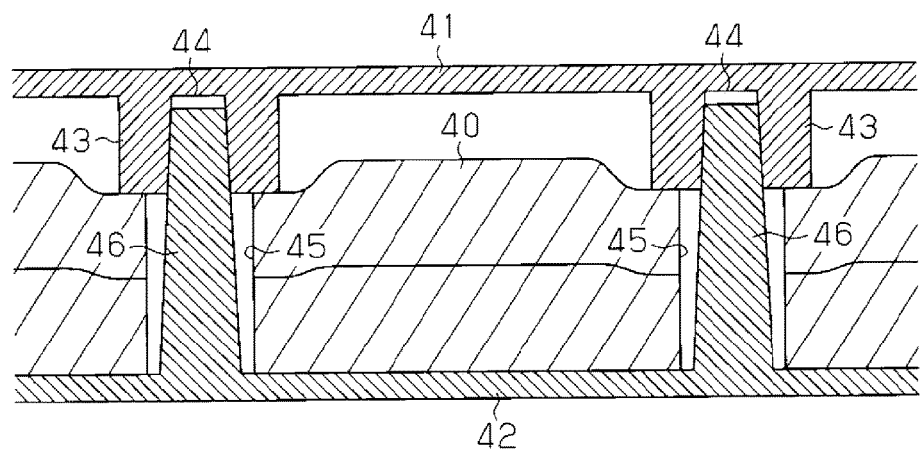
[Fig. 18]
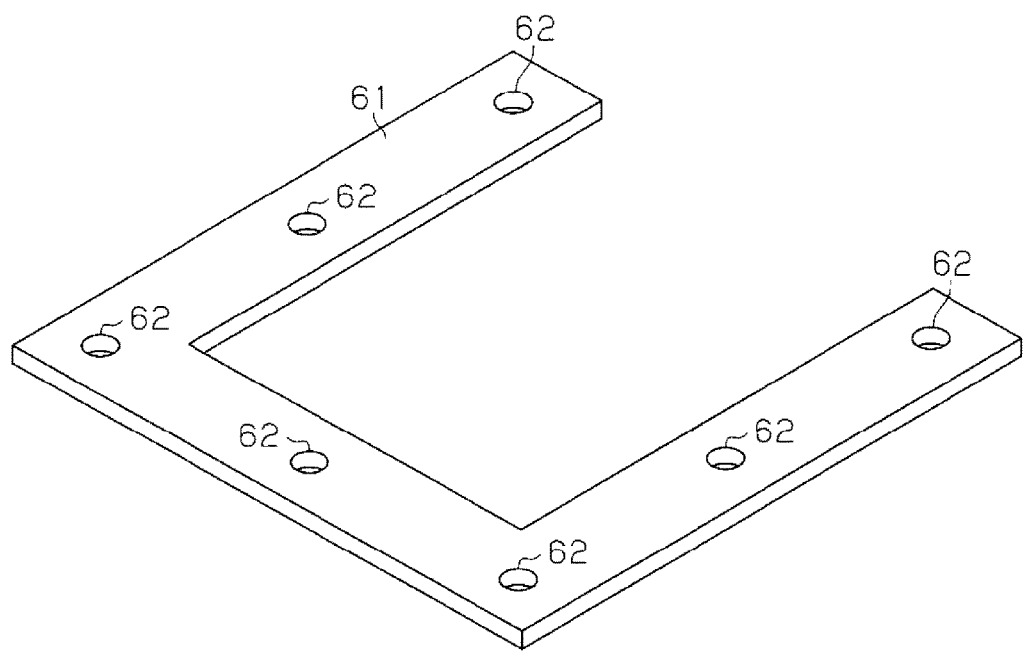

[Fig. 19]
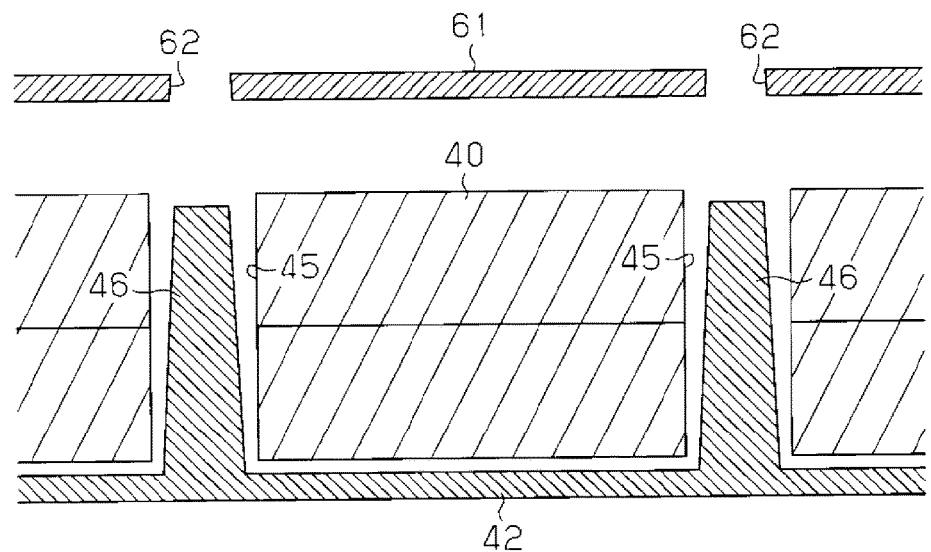
[Fig. 20]
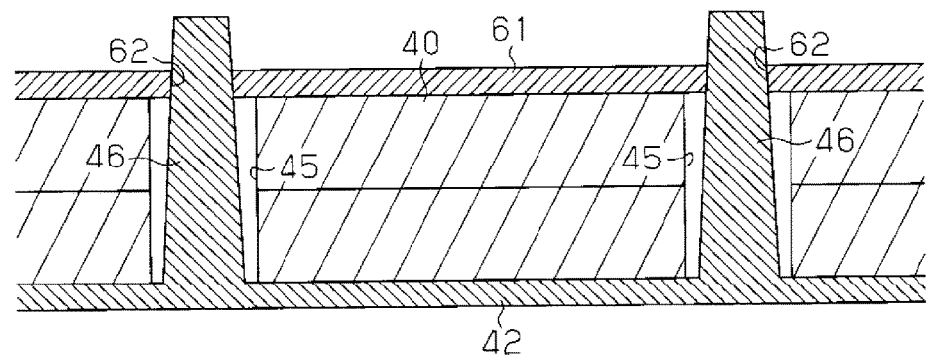

[Fig. 21]
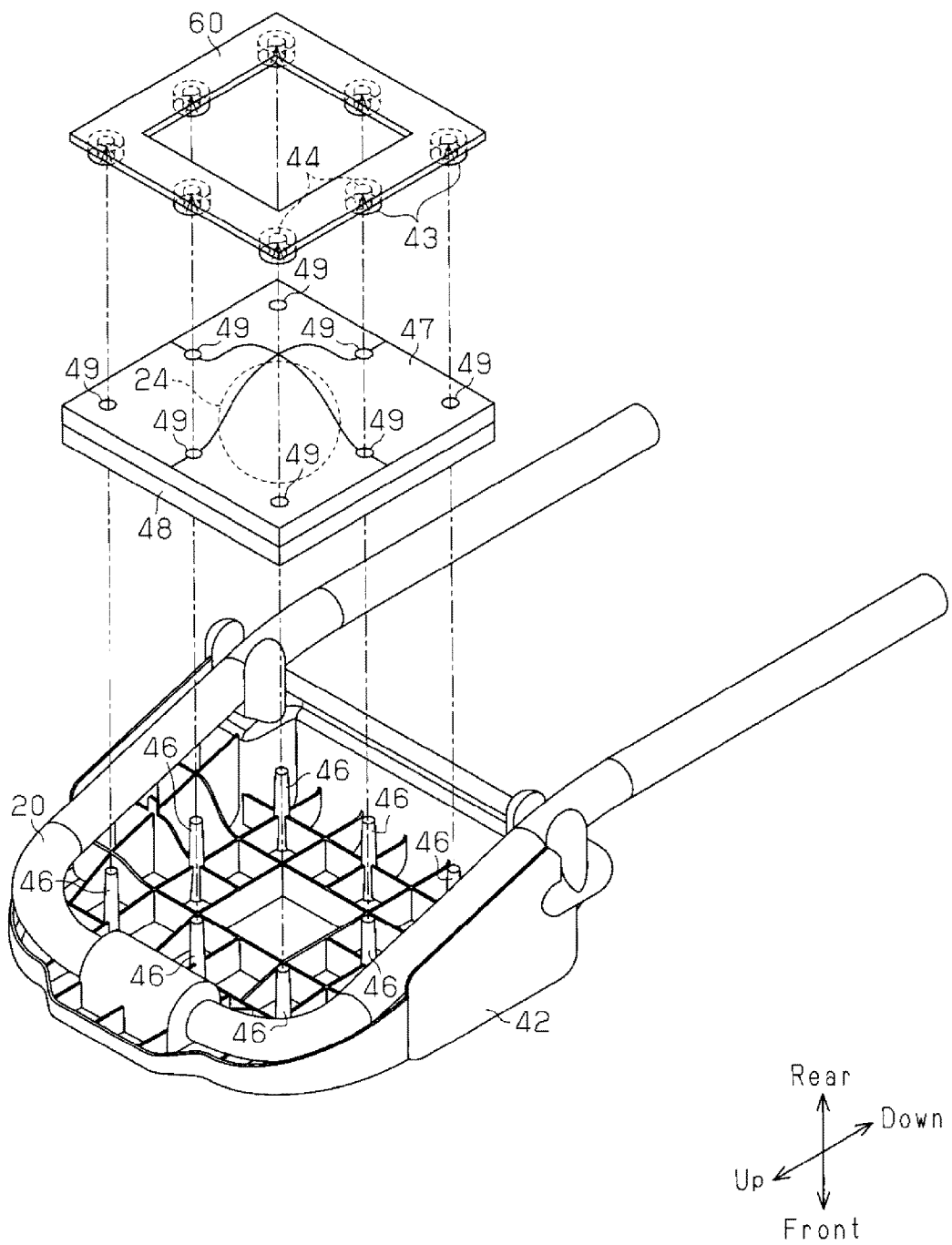

VEHICLE SEAT

CROSS-REFERENCE TO RELATED APPLICATIONS

This is a national phase application based on the PCT International Patent Application No. PCT/JP2014/002806 filed May 28, 2014, claiming priority to Japanese Patent Application No. 2013-117888 filed Jun. 4, 2013, the entire contents of both of which are incorporated herein by reference.

TECHNICAL FIELD

The present invention relates to a vehicle seat that includes a weight, which function as a mass of a dynamic damper.

BACKGROUND ART

Vibrations transmitted from an engine and a vehicle body may vibrate vehicle seats, which is uncomfortable to passengers. In the prior art, vehicle seats have been proposed to dampen vibrations. PTL 1 describes an example of such a vehicle seat that includes a weight made of lead or the like and arranged in a cushion material of the seat. The weight functions as a mass of a dynamic damper.

FIG. 22 shows a cross-section of a seat back (backrest) of the vehicle seat described in PTL 1. The vehicle seat includes a seat back frame 50, which functions as a frame member of the seat back, a cushion material 51, which encloses the seat back frame 50, and a cover 52, which covers the cushion material 51. The cushion material 51 is made of a foamed material such as a polyurethane foam. The cover 52 is formed from fabric, plastic, or synthetic leather.

A weight 53 is arranged behind the seat back frame 50 in the cushion material 51. The weight 53 is a metal plate made of lead, for example. The weight 53 is formed integrally with the cushion material 51 through insert molding. To increase the compatibility with the cushion material 51, the weight 53 is covered with a solid urethane foam 54.

In such a vehicle seat, the weight 53 functions as the mass of the dynamic damper and the cushion material 51 functions as the spring of the dynamic damper so that a vibration damping effect acts on the entire seat. Further, PTL 2 describes a headrest incorporating a weight that functions as a mass of a dynamic damper.

CITATION LIST

Patent Literature

PTL 1: Japanese Laid-Open Patent Publication No. 2001-161489
PTL 2: Japanese Laid-Open Patent Publication No. 2010-201848

SUMMARY OF INVENTION

Technical Problem

In order for a dynamic damper of a vehicle seat to produce a sufficient vibration damping effect, the weight in the cushion material needs to be sufficiently movable. However, the hardness of the cushion material is set taking into consideration impact absorption and seating comfort. Thus, the material of the cushion may not be soft enough to ensure sufficient movement of the weight.

It is an object of the present invention to provide a vehicle seat that achieves a preferable vibration damping effect regardless of the material of the cushion material.

Solution to Problem

One aspect of the present invention is a vehicle seat including a frame member of the seat, a cushion material covering the frame member, a soft member that is softer than the cushion material and secured to the frame member, and a weight located in the soft member.

BRIEF DESCRIPTION OF DRAWINGS

FIG. 1 is a partial transparent view showing the inner structure of a vehicle seat of a first embodiment.

FIG. 2 is a perspective view showing a headrest of the vehicle seat of FIG. 1 in which the cushion material is partially removed.

FIG. 3 is a perspective view showing an urethane pad that forms a soft member of the headrest of FIG. 2.

FIG. 4 is a perspective view showing how the urethane pad encapsulates a weight.

FIG. 5 is an exploded perspective view showing the inner structure of the headrest of FIG. 2.

FIG. 6 is a cross-sectional view showing the urethane pad in the headrest.

FIG. 7 is a perspective view showing an urethane pad of a modified example of the first embodiment.

FIG. 8 is a cross-sectional view showing the urethane pad of FIG. 7 in the headrest.

FIG. 9 is a perspective view showing an urethane pad of another modified example of the first embodiment.

FIG. 10 is a cross-sectional view showing the urethane pad of FIG. 9 in the headrest.

FIG. 11 is a perspective view showing a compression mold used to make the urethane pad of FIG. 9.

FIG. 12 is a perspective view showing a compression bonding process in manufacturing of the urethane pad of FIG. 9.

FIG. 13 is a perspective view showing a cutting process in manufacturing of the urethane pad of FIG. 9.

FIG. 14 is an exploded perspective view showing the inner structure of a headrest in a vehicle seat of a second embodiment.

FIG. 15 is a perspective view showing a stopper used in the vehicle seat of FIG. 14.

FIG. 16 is a cross-sectional view showing the urethane pad before the stopper of FIG. 15 is attached.

FIG. 17 is a cross-sectional view showing the urethane pad after the stopper of FIG. 15 is attached.

FIG. 18 is a perspective view showing a stopper of a modified example of the second embodiment.

FIG. 19 is a cross-sectional view showing the urethane pad before the stopper of FIG. 18 is attached.

FIG. 20 is a cross-sectional view showing the urethane pad after the stopper of FIG. 18 is attached.

FIG. 21 is an exploded perspective view showing the inner structure of a headrest of another modified example of the second embodiment.

DESCRIPTION OF EMBODIMENTS

First Embodiment

Figure 22:
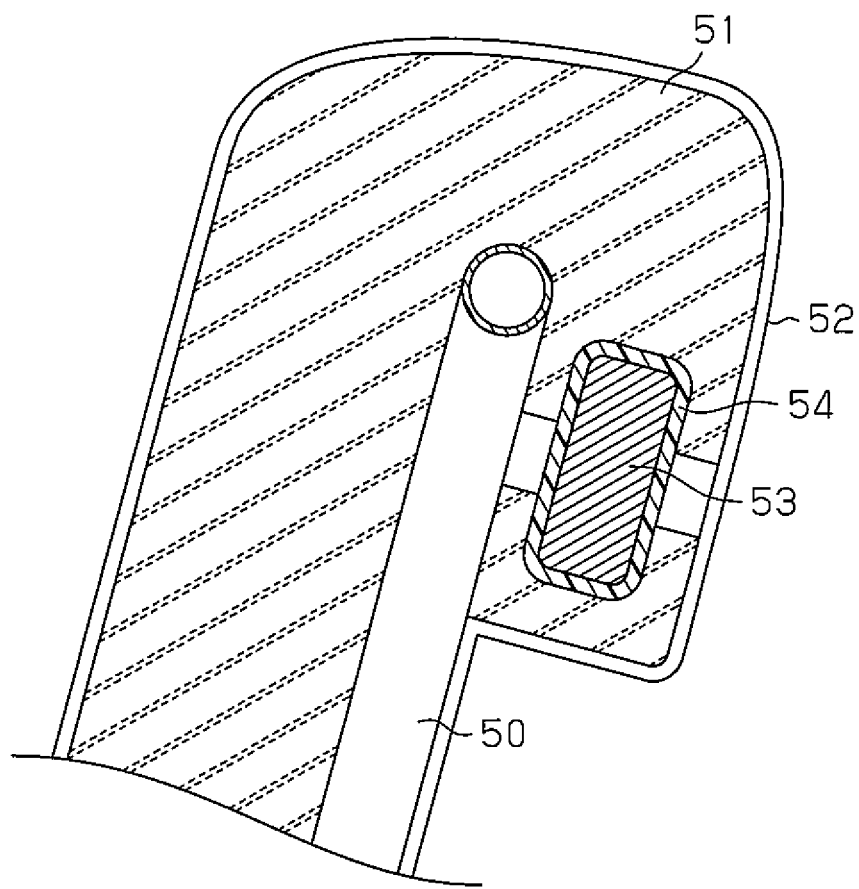
FIG. 22 is a cross-sectional view showing a seat back of a conventional vehicle seat including a dynamic damper.

Referring to FIGS. 1 to 6, a first embodiment of a vehicle seat will now be described.

As shown in FIG. 1, the vehicle seat of the first embodiment includes a seat cushion 10, on which a passenger is seated, a seat back 11, which functions as a backrest for the passenger, and a headrest 12, which supports the head of the passenger from the rear.

The seat cushion 10 includes a seat cushion frame 13. The seat cushion frame 13 functions as a frame member of a framework of the seat cushion 10. The seat cushion 10 includes a cushion material 14 made of a foamed material such as urethane. The cushion material 14 covers the upper surface of the seat cushion frame 13.

The seat back 11 includes a seat back frame 15, which functions as a frame member. A reclining mechanism 16 couples the seat back frame 15 to the seat cushion frame 13. The reclining mechanism 16 allows the seat back 11 to tilt forward and rearward relative to the seat cushion 10. The seat back 11 includes a cushion material 17 made of a foamed material such as urethane. The cushion material 17 covers the front side of the seat back frame 15.

The headrest 12 includes a headrest stay 20, which is a U-shaped metal pipe, and a resin insert 22, which is fixed to the upper portion of the headrest stay 20. The headrest stay 20 and the resin insert 22 each function as a frame member. The headrest 12 also includes a cushion material 21 surrounding the resin insert 22. The cushion material 21 is a molded urethane foam, which is formed by foaming liquid urethane in a mold. The two ends of the headrest stay 20 each extend downward from the cushion material 21 toward the seat back 11 and into a bracket 18. This fixes the headrest 12 to the seat back 11.

FIG. 2 is a perspective view of the headrest 12 from which the cushion material 21 is partially removed. As shown in FIG. 2, the headrest 12 further includes a urethane pad 25 fixed to the rear side of the resin insert 22. The urethane pad 25 functions as a soft member.

As shown in FIG. 3, the urethane pad 25 encapsulates a spherical weight 24 made of a metal such as lead. The urethane pad 25 is made of a slabstock urethane foam that is softer than the molded urethane foam of the cushion material 21. The portion of the urethane pad 25 that surrounds the weight 24 includes a plurality of (five in the example of in FIG. 3) securing openings 26, which extend through the urethane pad 25.

As shown in FIG. 4, when encapsulating the weight 24 in the urethane pad 25, the single rectangular urethane pad 25 is folded in two so that the weight 24 is held between the two overlapping segments of the urethane pad 25.

As shown in FIG. 5, the back side of the resin insert 22 includes securing pins 27 that are equal in number to the securing openings 26 of the urethane pad 25. The securing pins 27 are formed integrally with the resin insert 22 and extend toward the rear. The urethane pad 25 is secured to the resin insert 22 by inserting the securing pins 27 into the corresponding securing openings 26.

As shown in FIG. 6, each securing pin 27 includes a distal end that forms a hook 28. The hook 28 restricts separation of the securing pin 27 from the securing opening 26. This secures the urethane pad 25 to the resin insert 22.

The resin insert 22, to which the urethane pad 25 is coupled, and the headrest stay 20 are fixed together and arranged in a mold. Liquid urethane is then introduced into the mold and foamed to form the cushion material 21. The cushion material 21 is placed around the urethane pad 25. Thus, the soft member, which is softer than the cushion material 21, is arranged between the weight 24 and the cushion material 21.

The operation of the present embodiment will now be described.

The headrest 12 of the vehicle seat of the present embodiment includes the weight 24 that is elastically supported in the cushion material 21. This enables the headrest 12 to function as a dynamic damper that uses the weight 24 as a mass. In addition, the urethane pad 25, which is softer than the cushion material 21, encapsulates the weight 24. This ensures that the weight 24 in the headrest 12 is sufficiently movable regardless of the hardness of the cushion material 21.

Further, the urethane pad 25 encapsulating the weight 24 is secured to the resin insert 22 of the headrest 12. This facilitates and ensures that the urethane pad 25 and the weight 24 are held fixed when molding the cushion material 21.

The headrest 12 of the present embodiment has the advantages described below.

(1) The soft member (urethane pad 25), which is softer than the cushion material 21, is arranged between the weight 24 and the cushion material 21. This ensures that the weight 24 in the headrest 12 is movable regardless of the hardness of the cushion material 21. Thus, the present embodiment further ensures that a sufficient vibration damping effect is obtained.

(2) The damping performance of the dynamic damper can be adjusted by just changing the thickness of the urethane pad 25. This facilitates the adjustment of the resonance frequency of the vehicle seat.

(3) The urethane pad 25 encapsulating the weight 24 is secured to the resin insert 22. This facilitates and ensures the fixing of the urethane pad 25 and the weight 24 when molding the cushion material 21.

The present embodiment may be modified as follows.

In the headrest 12 of the above embodiment, if the securing of the urethane pad 25 to the securing pins 27 is insufficient, a gap may be formed between the segments of the urethane pad 25 that overlap each other. When molding the cushion material 21, the liquid urethane may flow through such a gap and form the cushion material 21 between the weight 24 and the urethane pad 25. To solve this problem, the overlapping segments of the urethane pad 25 may be joined to each other around the weight 24 to limit the formation of a gap that passes the liquid urethane.

In the example shown in FIGS. 7 and 8, the soft member that encapsulates the weight 24 is formed by folding a single urethane pad 30 into two segments. The weight 24 is held between the two overlapping segments. The overlapping segments of the urethane pad 30 are sewed together around the weight 24 by a thread 31.

Thus, even if the securing of the urethane pad 30 to the securing pins 27 is insufficient, the liquid urethane does not reach the periphery of the weight 24 when molding the cushion material 21.

In the example shown in FIGS. 9 and 10, the soft member that encapsulates the weight 24 is formed by two urethane pads 32 and 33 that are overlapped with each other. The weight 24 is held between the urethane pads 32 and 33. The two urethane pads 32 and 33 have the same shape and size.

The overlapping urethane pads 32 and 33 that surround the weight 24 are compressed-bonded to each other at bonded portions B (shaded portion in FIG. 9). In addition, a plurality of securing openings 26 extends through the bonded portions B of the urethane pads 32 and 33.

Thus, even if the securing of the urethane pads 32 and 33 to the securing pins 27 is insufficient, the liquid urethane does not reach the periphery of the weight 24 while molding the cushion material 21.

In this example, the compression in the compression-bonding process reduces the thickness of the portions at which the urethane pads 32 and 33 are secured to the resin insert 22, that is, the portions including the securing openings 26. This reduces the depth of the securing openings 26 and the length of the securing pins 27. Thus, when attaching the urethane pads 32 and 33 to the resin insert 22, the insertion of the securing pins 27 into the securing openings 26 is facilitated. This facilitates the securing of the urethane pads 32 and 33 to the resin insert 22.

Furthermore, such structure is suitable for mass production. In the example in which the urethane pad 30 is sewn as described above, the urethane pad 30 needs to be sewn one by one. However, in the example in which the urethane pads 32 and 33 are compressed and bonded as described above, the urethane pads 32 and 33 may be simultaneously bonded in batches.

FIG. 11 shows an example of a mold for compression bonding. An upper mold 35A and a lower mold 35B each have a plurality of semispherical recesses 34 on the compression surface that is pressed against the urethane pad 32 or 33. The lower mold 35B includes magnets 38 located below the recesses 34.

FIG. 12 shows how urethane pads are compression-molded using the upper mold 35A and the lower mold 35B. First, a large urethane pad 36 is arranged on the compression surface of the lower mold 35B. The urethane pad 36 has a size equivalent to a plurality of urethane pads 36 (twelve pads in the example of FIG. 12). Then, the weights 24 are arranged on the sections of the urethane pad 36 that correspond to the recesses 34 of the lower mold 35B. An urethane pad 37, which has the same size as the urethane pad 36, is arranged on the urethane pad 36 and the weights 24. The upper mold 35A is pressed onto the urethane pad 37, and heat or vibration is applied to the urethane pads 36 and 37. Accordingly, the portions of the urethane pads 36 and 37 that surround the weights 24 are bonded to each other. Then, as shown in FIG. 13, the bonded urethane pads 36 and 37 are cut into sets of the urethane pads 32 and 33. In each section, the portions of the urethane pads 32 and 33 that surround the weight 24 are bonded to each other.

Second Embodiment

Referring to FIGS. 14 to 17, a second embodiment of a vehicle seat will now be described. The second embodiment differs from the first embodiment in the inner structure of the headrest 12. Otherwise, the second embodiment is has the same structure as the first embodiment.

Referring to FIG. 14, in the headrest 12 of the vehicle seat of the second embodiment, an urethane pad 40, which encapsulates the weight 24, is held between a resin stopper 41 and a resin insert 42, which is fixed to the headrest stay 20. This fixes the urethane pad 40 to the resin insert 42. The cushion material of the headrest 12 is a molded urethane foam formed by foaming an urethane material in a mold in which the headrest stay 20, the weight 24, the urethane pad 40, the stopper 41, and the resin insert 42 are arranged.

In the same manner as the urethane pad 25 of the FIG. 3, the soft member that encapsulates the weight 24 is formed by folding the rectangular urethane pad 40 into two segments to hold the weight 24 between the two segments. The urethane pad 40 is made of a slabstock urethane foam that is softer than the molded urethane foam of the cushion material of the headrest 12.

The portion of the urethane pad 40 that surrounds the weight 24 includes a plurality of (seven in the example of FIG. 14) securing openings 45 extending through the urethane pad 40.

The resin insert 42 includes securing pins 46 that are equal in number to the securing openings 45. The securing pins 46, which are formed integrally with the resin insert 42, extend toward the rear and into the corresponding securing openings 45. Each securing pin 46 is tapered toward the distal end.

As shown in FIG. 15, the stopper 41 is a U-shaped flat plate. The stopper 41 is arranged on the urethane pad 40 to cover the portion of the urethane pad 40 that surrounds the weight 24 from three sides. The folded portion of the urethane pad 40 is not covered by the stopper 41. The stopper 41 includes bosses 43 on the side that faces the urethane pad 40. The bosses 43 are arranged at positions corresponding to the securing openings 45. Each boss 43 includes a securing hole 44 tapered toward the bottom.

As shown in FIG. 16, when attaching the urethane pad 40 to the resin insert 42, the securing pins 46 of the resin insert 42 are inserted into the corresponding securing openings 45 of the urethane pad 40. Then, as shown in FIG. 17, the distal end of each securing pin 46 is press-fitted to the corresponding securing hole 44 to fix the stopper 41 to the resin insert 42. This secures the urethane pad 40 to the resin insert 42.

The operation of the second embodiment will now be described.

The headrest 12 of the vehicle seat of the present embodiment includes the weight 24 that is elastically supported in the cushion material. This enables the headrest 12 to function as a dynamic damper. In addition, the urethane pad 40, which is softer than the cushion material, encapsulates the weight 24. This ensures that the weight 24 is movable in the headrest 12 regardless of the hardness of the cushion material.

Further, the urethane pad 40 encapsulating the weight 24 is secured to the resin insert 42. This ensures that the urethane pad 40 and the weight 24 are held fixed in the mold when molding the cushion material.

In the headrest 12 of the second embodiment, the portion of the urethane pad 40 that is in contact with the stopper 41 is compressed between the stopper 41 and the resin insert 42. Thus, the overlapping segments of the urethane pad 40 are pressed to each other around the weight 24. This limits the entry of the liquid urethane into the urethane pad 40 when molding the cushion material.

The headrest 12 of the second embodiment has the following advantages.

(1) The soft member (urethane pad 40), which is softer than the cushion material, is arranged between the weight 24 and the cushion material. This ensures that the weight 24 is movable in the headrest 12 regardless of the hardness of the cushion material. Thus, the present embodiment ensures sufficient vibration damping effects.

(2) The damping performance of the dynamic damper can be adjusted by just changing the thickness of the urethane pad 40. This facilitates the adjustment of the resonance frequency of the vehicle seat.

(3) The urethane pad 40 encapsulating the weight 24 is secured to the resin insert 42. This facilitates and ensures that the urethane pad 40 and the weight 24 are held fixed in the mold when molding the cushion material 21.

(4) The urethane pad 40 encapsulating the weight 24 is secured to the resin insert 42 by holding the urethane pad 40 between the resin insert 42 and the stopper 41, which is fixed to resin insert 42. This further ensures the securing of the urethane pad 40 to the resin insert 42.

The second embodiment may be modified as follows.

In the second embodiment, the stopper 41 is secured to the resin insert 42 by fitting the securing pins 46 into the securing holes 44 in the bosses 43 of the stopper 41. Alternatively, the securing may be achieved as follows.

FIG. 18 shows a stopper 61 that includes a plurality of (seven in the example shown in FIG. 18) securing holes 62 instead of the bosses 43 and the securing holes 44. The securing holes 62 extend through the stopper 61. Each securing hole 62 tapered away from the urethane pad 40.

As shown in FIG. 19, when attaching the urethane pad 40 to the resin insert 42, the securing pins 46 of the resin insert 42 are inserted into the respective securing openings 45 of the urethane pad 40. Then, as shown in FIG. 20, the distal ends of the securing pins 46 are fitted into the respective securing holes 62 to fix the stopper 61 to the resin insert 42. This secures the urethane pad 40 to the resin insert 42. The portion of the urethane pad 40 that is in contact with the stopper 61 is compressed between the stopper 61 and the resin insert 42. Thus, the overlapping segments of the urethane pad 40 are pressed to each other around the weight 24. This limits the entrance of the liquid urethane into the urethane pad 40 when molding the cushion material.

In the above embodiment, the weight 24 is encapsulated in the urethane pad 40 that is folded into two segments. However, two urethane pads, each serving as a segment, may be used to encapsulate the weight 24. In the same manner as described above, the urethane pads and the weight 24 may be secured to the resin insert 42 by a stopper. Such a structure has the same advantages as the embodiment described above.

FIG. 21 shows one example of the inner structure of the headrest 12 with such structure. In this example, the weight 24, which functions as a mass of the headrest 12, is held between two urethane pads 47 and 48 of the same shape and size. The portions of the urethane pads 47 and 48 that surround the weight 24 include a plurality of (eight in the example of FIG. 21) securing openings 49. The securing openings 49 extend through the urethane pads 47 and 48.

The headrest 12 includes a stopper 60 that is a flat plate shaped like a square frame to cover the entire periphery of the urethane pads 47 and 48. The stopper 60 includes bosses 43 on the surface that faces the urethane pad 47. Each boss 43 includes a securing hole 44. The bosses 43 are equal in number to the securing openings 49 and arranged in positions corresponding to the securing openings 49. Securing pins 46 extend from the back side of the resin insert 42. The securing pins 46 are equal in number to the securing holes 44 of the stopper 60 and arranged in positions corresponding to the securing holes 44.

In the same manner as described above, the securing pins 46 of the resin insert 42 are inserted into the securing openings 49 of the urethane pads 47 and 48. Then, the distal ends of the securing pins 46 are fitted into the securing holes 44 to fix the stopper 60 to the resin insert 42. This secures the urethane pads 47 and 48, which encapsulate the weight 24, to the resin insert 42. In this example, instead of the bosses 43 and the securing holes 44, the stopper 60 may include securing holes like the securing holes 62 of the stopper 61 shown in FIG. 18 to secure the stopper 60 to the resin insert 42.

It should be apparent to those skilled in the art that the present invention may be embodied in many other specific forms without departing from the spirit or scope of the invention. Particularly, it should be understood that the present invention may be embodied in the following forms.

In the above embodiments, the weight 24 is made of a metal such as lead. However, the weight 24 may be made of other materials as long as the weight 24 has sufficient weight to function as a mass of a dynamic damper. Further, the weight 24 may have a shape other than spherical shape.

The positions and numbers of the securing openings of the urethane pads and the securing pins of the resin inserts 22 and 42 may be modified.

The urethane pad that encapsulates the weight 24 may have a shape other than a rectangular shape. Regardless of the shape, as long as the urethane pad is secured to the resin insert 42, the fixing of the urethane pad and the weight in the mold is facilitated when molding the cushion material 21.

In the above embodiments, the soft member that encapsulates the weight 24 is an urethane pad made of a slabstock urethane foam. However, the soft member may be made by other methods. For example, the soft member may be made by foaming an urethane material in a mold in which the weight 24 is arranged. Regardless of the method of forming the soft member, as long as the soft member is secured to the resin insert 42, the fixing of the urethane pad and the weight 24 in the mold is facilitated when molding the cushion material 21.

In the above embodiments, the soft member is secured to the resin insert by inserting the securing pins of the resin insert into the securing openings of the urethane pad functioning as the soft member. The hooks 28 at the distal ends of the securing pins 27 and the stoppers 41 and 61 are used to restrict separation of the securing pins from the soft member. However, the securing may be achieved by other methods.

In the above embodiments, the soft member and the weight 24 are arranged behind the resin insert 22 or 42 in the headrest 12. However, the soft member and the weight 24 may be arranged in other positions.

In the above embodiments, the weight 24, which functions as the mass of the dynamic damper, and the soft member, which encapsulates the weight 24, are arranged in the headrest 12. However, the weight 24 and the soft member may be arranged in the seat cushion 10 or the seat back 11. In this case, even if the cushion material 14 or 17 is hard, the arrangement of the weight 24 in a soft member that is softer than the cushion material 14 or 17 allows the movability of the weight 24 and the sufficient vibration damping effect. In addition, the weight 24 and the soft member can be easily arranged in the vehicle seat by directly securing the weight 24 and the soft member to the seat cushion frame 13 or the seat back frame 15, which function as the frame member of the seat cushion 10 or the seat back 11. Alternatively, the weight 24 and the soft member may be secured to the frame 13 or 15 through a securing member fixed to the frame 13 or 15.

The present examples and embodiments are to be considered as illustrative and not restrictive and the invention is not to be limited to the details given herein, but may be modified within the scope and equivalence of the appended claims.

The invention claimed is:

1. A vehicle seat comprising:
a frame member of the seat;
a cushion material covering the frame member;
a soft member that is softer than the cushion material and directly secured to the frame member; and
a weight located in the soft member, wherein
a peripheral portion of the soft member that surrounds the weight is directly secured to the frame member.

2. The vehicle seat according to claim 1, wherein
the soft member includes an urethane pad including overlapped segments, wherein the weight is held between the overlapped segments, and
each of the overlapped segments includes a bonded portion that is compression-bonded to the bonded portion of another of the overlapped segments, wherein the bonded portion surrounds the weight.

3. The vehicle seat according to claim 2, wherein the urethane pad is secured to the frame member at the bonded portions.

4. The vehicle seat according to claim 1, wherein
the frame member includes a securing pin extending from the frame member,
the peripheral portion of the soft member includes a securing opening extending through the soft member,
the stopper includes a securing hole, and
the securing pin is inserted into the securing opening of the soft member and the securing hole of the stopper.

5. The vehicle seat according to claim 1, wherein
the frame member include a securing pin extending from the frame member,
the peripheral portion of the soft member includes a securing opening extending through the soft member, and
the securing pin is inserted into the securing opening to secure the peripheral portion of the soft member to the frame member.

6. The vehicle seat according to claim 1, further comprising a stopper that sandwiches only the peripheral portion of the soft member with the frame member to secure the peripheral portion of the soft member to the frame member, wherein
the stopper and the frame member compress the soft member.

7. A vehicle seat comprising:
a frame member of the seat;
a cushion material covering the frame member;
a soft member that is softer than the cushion material and directly secured to the frame member; and
a weight located in the soft member,
wherein a peripheral portion of the soft member that surrounds the weight is directly secured to the frame member,
wherein the frame member include a securing pin extending from the frame member,
wherein the soft member includes a securing opening extending through the soft member, and
wherein the securing pin is inserted into the securing opening to secure the soft member to the frame member.

8. A vehicle seat comprising:
a frame member of the seat;
a cushion material covering the frame member;
a soft member that is softer than the cushion material and directly secured to the frame member; and
a weight located in the soft member.

9. The vehicle seat according to claim 8, wherein
the soft member includes an urethane pad including overlapped segments, wherein the weight is held between the overlapped segments; and
each of the overlapped segments includes a bonded portion that is compression-bonded to the bonded portion of another of the overlapped segments, wherein the bonded portion surrounds the weight.

10. The vehicle seat according to claim 9, wherein the urethane pad is secured to the frame member at the bonded portions.

11. The vehicle seat according to claim 8, further comprising a stopper that sandwiches the soft member with the frame member to secure the soft member to the frame member.

12. The vehicle seat according to claim 11, wherein the stopper and the frame member compress the soft member.

13. The vehicle seat according to claim 11, wherein
the frame member includes a securing pin extending from the frame member;
the soft member includes a securing opening extending through the soft member;
the stopper includes a securing hole; and
the securing pin is inserted into the securing opening of the soft member and the securing hole of the stopper.

14. The vehicle seat according to claim 8, wherein
the frame member include a securing pin extending from the frame member;
the soft member includes a securing opening extending through the soft member; and
the securing pin is inserted into the securing opening to secure the soft member to the frame member.

* * * * *